(12) United States Patent
Ryan

(10) Patent No.: US 12,167,705 B2
(45) Date of Patent: Dec. 17, 2024

(54) GAUGE WHEEL SYSTEM

(71) Applicant: Ryan Farming Machinery Pty Ltd, Horsham (AU)

(72) Inventor: Paul Ryan, Horsham (AU)

(73) Assignee: Ryan Farming Machinery Pty Ltd, Horsham (AU)

( * ) Notice: Subject to any disclaimer, the term of this patent is extended or adjusted under 35 U.S.C. 154(b) by 787 days.

(21) Appl. No.: 17/330,188

(22) Filed: May 25, 2021

(65) Prior Publication Data

US 2021/0368664 A1    Dec. 2, 2021

(51) Int. Cl.
*A01C 5/06* (2006.01)
(52) U.S. Cl.
CPC ................... *A01C 5/062* (2013.01)
(58) Field of Classification Search
CPC .................. A01C 5/062; A01C 5/064
See application file for complete search history.

(56) References Cited

FOREIGN PATENT DOCUMENTS

WO    WO-2018213879 A1 * 11/2018 ............. A01B 15/16

* cited by examiner

*Primary Examiner* — Tara Mayo
(74) *Attorney, Agent, or Firm* — Bochner PLLC; Andrew Bochner; Eric Kleinertz

(57) ABSTRACT

The present invention relates generally to agricultural devices, and in particular, to a gauge wheel system for use in an agricultural device. In one aspect of the invention there is provided a gauge wheel for use on cultivation equipment comprising a hub member having a central bearing portion for mounting to the cultivation equipment; a peripheral flange portion displaced laterally with respect to the hub member; and a resilient coil member mounted to a surface of the hub member at a proximal end and comprising at least two windings that extend between the hub member and the peripheral flange portion to terminate at a free distal end adjacent the peripheral flange portion; wherein the free distal end of the resilient coil member is constrained to prevent contact of the resilient coil member with the peripheral flange portion.

10 Claims, 9 Drawing Sheets

GAUGE WHEEL SYSTEM

FIELD OF INVENTION

The present invention relates generally to agricultural devices, and in particular, to a gauge wheel system for use in an agricultural device.

BACKGROUND OF THE INVENTION

In the field of cultivation, gauge wheels are typically employed to control the depth of a disk or tine used for planting seed. Gauge wheels are typically fitted to the outside of a disc assembly or seeding tool and is configured to follow the ground surface to enable the seeding tools to deposit the seed at a desired ground depth. Where the gauge wheel which is placed adjacent to the leading edge of a single disc opener assembly it not only provides depth adjustment, but also functions to clean the leading face of the disc and limit soil lifting and minimising soil layer disturbance.

Traditionally, gauge wheels are typically manufactured with a rubber tyre, which is mounted to the outer periphery of a rim. The rubber of the gauge wheels often wears over time requiring replacement. Further, during use in muddy conditions, mud can build up on the surface of the tyre, which can alter the diameter of the gauge wheel and have an adverse effect on the depth of planting of the seed. The build-up of mud and the like can also cause the rubber wheels to bounce, thereby further minimizing the effectiveness and accuracy of the system. In order to remedy such problems, constant cleaning of the gauge wheel is required, which wastes time and increases labor requirements, as well as significantly impacting the efficiency of the overall system.

A variety of systems have been proposed to address these issues. One such system is disclosed in International PCT Patent Application No. PCT/AU2018/050494. This application discloses a gauge wheel system that employs a resilient coil member attached to a hub member and wound in a plurality of windings so as to substitute for a conventional tyre. Whilst such systems have proven effective in minimising wear and reducing mud collection, they have the potential to be overly flexible and bounce over a ground surface, which can significantly impact the functionality of the system.

Thus, there is a need to provide for an improved gauge wheel system that provides a smoother ride over the ground surface and is able to release any build-up of mud or organic material that may be captured within the system.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the invention there is provided a gauge wheel for use on cultivation equipment comprising:
- a hub member having a central bearing portion for mounting to the cultivation equipment;
- a peripheral flange portion displaced laterally with respect to the hub member; and
- a resilient coil member mounted to a surface of the hub member at a proximal end and comprising at least two windings that extend between the hub member and the peripheral flange portion to terminate at a free distal end adjacent the peripheral flange portion;
- wherein the free distal end of the resilient coil member is constrained to prevent contact of the resilient coil member with the peripheral flange portion.

In one embodiment, the hub member may comprise at least three spokes that extend radially from the central bearing portion to define a surface of the hub member that is substantially open.

The peripheral flange portion may be detachably mounted to the hub member at a distal end of the spokes. The peripheral flange portion may be detachably mounted to the distal end of the spokes by way of a plurality of support bars. The support bars may be mounted to a surface of the peripheral flange portion and extend inside the resilient coil member to engage with the distal ends of the spokes.

The support bars may have a cover member mounted thereon. The cover member may be configured to contact the resilient coil member to constrain and prevent contact of the resilient coil member with the peripheral flange portion.

In another embodiment, the peripheral flange portion may be non-removably attached with the hub member. The hub member may have at least three spoke members extending between the central bearing portion and the peripheral flange portion such that the hub member is substantially open.

At least one spacer member may be mounted to the hub member so as to locate and constrain the resilient coil member in position. The at least one spacer member may be mounted on a support bar extending from the peripheral flange portion and within the windings of the resilient coil member towards the hub member.

At least two support bars may extend from the peripheral flange portion at opposing positions about a periphery thereof. The at least one spacer member may have a projection that abuts the coil member to substantially constrain the coil member in position. The projection may be configured to at least partially receive the coil member.

In accordance with another aspect, there is provided a gauge wheel for use on cultivation equipment comprising:
- a hub member having a central bearing portion for mounting to the cultivation equipment;
- a peripheral flange portion displaced laterally with respect to the hub member; and
- a resilient coil member mounted to a surface of the hub member at a proximal end and comprising at least two windings that extend between the hub member and the peripheral flange portion to terminate at a free distal end adjacent the peripheral flange portion;
- wherein the peripheral flange portion is detachable from the hub member to facilitate replacement of the peripheral flange portion.

BRIEF DESCRIPTION OF THE DRAWINGS

The invention may be better understood from the following non-limiting description of preferred embodiments, in which.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

The present invention will be described below in relation to a gauge wheel system for use in cultivation equipment. The gauge wheel system of the present invention may be employed for use with a variety of other equipment such as seeders and the like for planting seeds and young plants, as will be appreciated by those skilled in the art.

Figure 1:
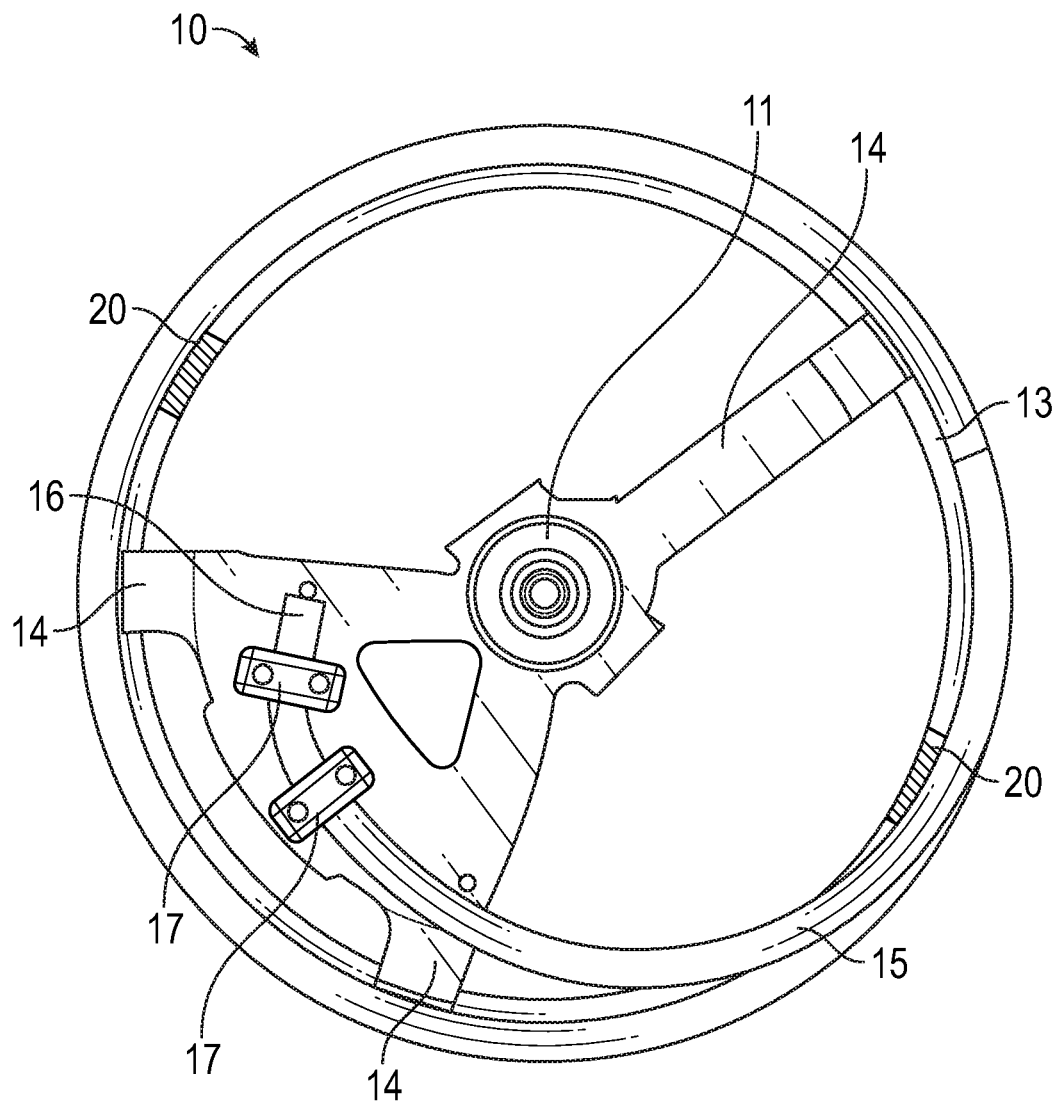
FIG. 1 is a front view of a gauge wheel in accordance with an embodiment of the present invention.

Referring to FIG. 1, a gauge wheel 10 is depicted in accordance with an embodiment of the present invention. The gauge wheel 10 comprises a hub portion 12 having a central bearing portion 11 for mounting to an axle or the like to enable the gauge wheel 10 to be supported on an axle of a cultivation machine (not shown). The hub portion 12 also has a peripheral flange portion 13 that is located radially from the central bearing portion 11, with the central bearing portion 11 being laterally offset with respect to the peripheral flange portion 13. Such a laterally offset central bearing portion 11 enables additional degrees of adjustment of the gauge wheel position during use, to adjust for any wearing of the cleaning lip and minimising further wear to the device.

The central bearing portion 11 is connected to the peripheral flange portion 13 by way of spokes 14. In the embodiment as depicted there are three spokes 14, although the number of spokes may vary as required. The three spokes 14 are spaced about the central bearing portion 11 in a manner that provides open spaces therebetween to enable any foreign matter, such that mud, soil and related matter, that may enter the wheel during use, to be readily released and not collect and build-up within the hub portion 12 of the wheel 10. As a result of the spokes 14, the surface of the hub portion is substantially open to prevent any build-up of soil or mud therein. In this regard, approximately 66% the surface of the hub portion is a void, however the percentage of the surface of the hub portion that is open or void may vary between 50-80%.

A resilient coil member 15 is mounted to the hub portion 12 to form the outer periphery of the gauge wheel 10 as shown. The coil member 15 is made from a resilient material, such as spring steel, although other resilient materials made from polymeric or composite materials, are also envisaged. The coil member is wound in a helical manner through approximately two windings, as is depicted more clearly in FIG. 2. Each of the windings are separated a distance to facilitate removal of foreign matter, such as mud and other organic material, which may lodge between the coil windings. The coil member 15 is wound in an arc that substantially approximates the arc of the peripheral flange portion 13 of the hub portion 12.

One end 16 of the coil member 15 is secured to an outer or front surface of the hub portion 12 by way of brackets 17. The second or distal end of the coil member 15 is not secured to the hub portion 12 and is maintained free to provide a degree of flexibility in the coil member 15 to allow movement of the coil member relative to the hub portion 12.

Figure 2:
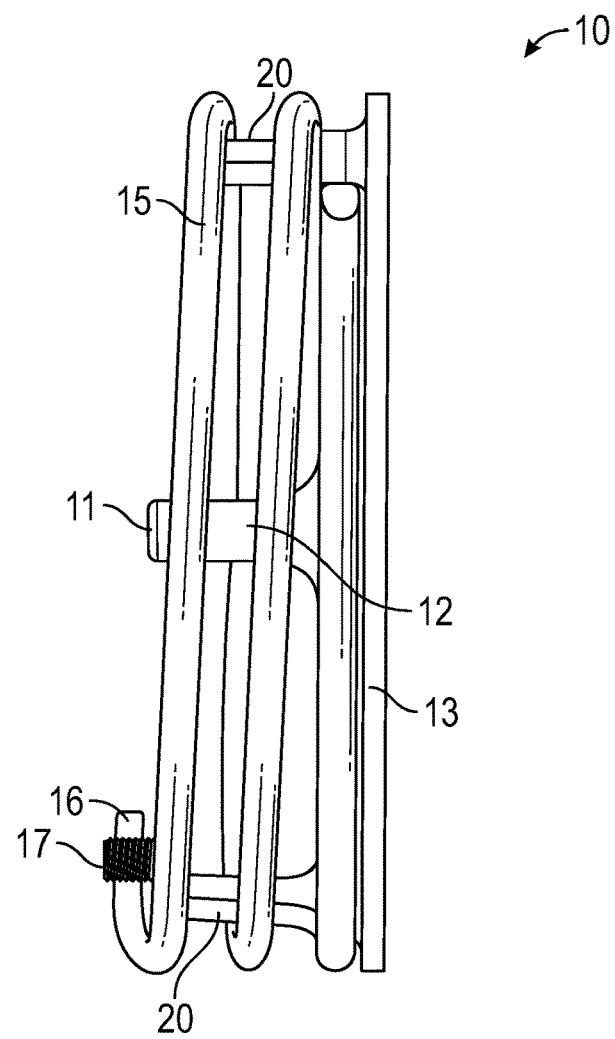
FIG. 2 is a top view of the gauge wheel of FIG. 1.

A pair of support bars 20 extend from the peripheral flange portion 15 of the hub portion 12 at opposing locations about the periphery thereof, as is shown in FIG. 2. The support bars 20 extend inside the coil member 15, as shown. The support bars 20 may be removable with respect to the hub portion 12 and may be interchangeable to be employed/deployed as required.

Figure 3:
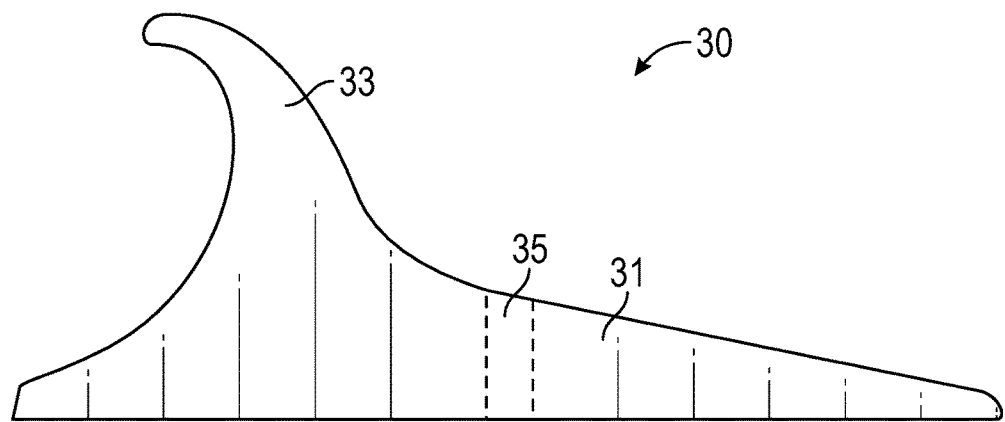
FIG. 3 is a side view of a spacer member in accordance with an embodiment of the present invention.
Figure 4:
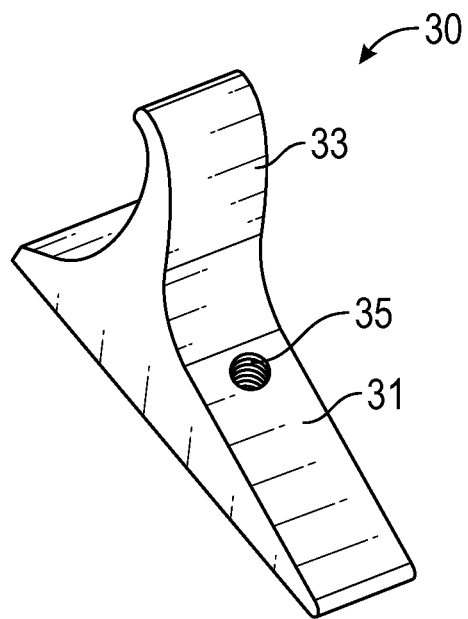
FIG. 4 is a perspective view of the spacer member of FIG. 3.
Figure 5:
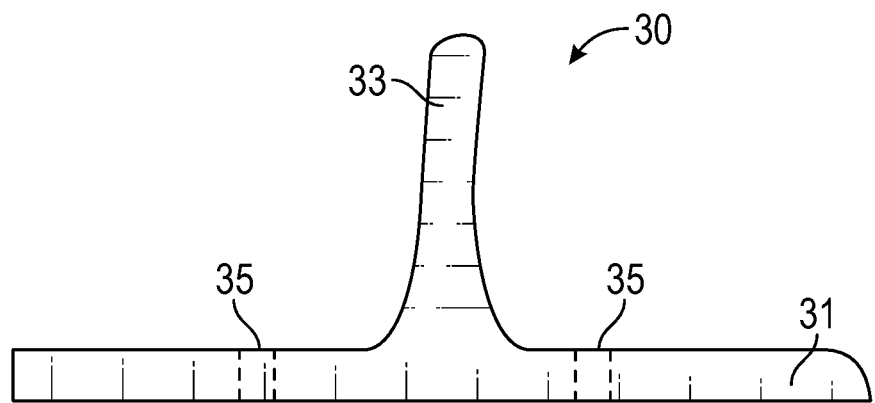
FIG. 5 is a side view of a spacer member in accordance with another embodiment of the present invention.
Figure 6:
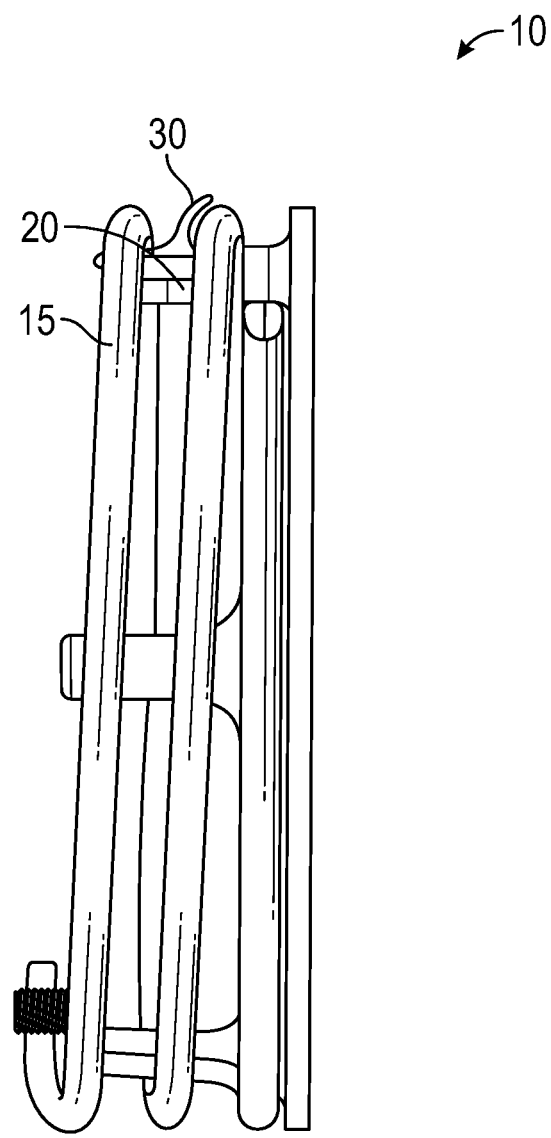
FIGS. 6 is a top view of the gauge wheel with the spacer member of FIGS. 3 and 4 employed for use.

Referring to FIGS. 3-5, spacer members 30 may be used with the gauge wheel 10 to minimise wear of the coil and the peripheral flange portion 15 during use. The spacer members 30 are made from a plastic material, such as nylon, and have a substantially wedge shaped base portion 31 having a substantially flat under-surface 32 that is to be positioned upon an outer surface of the support bar 20 when in use, as is depicted in FIG. 6. A projection 33 extends from an upper surface of the base portion 31. In the embodiment as depicted in FIGS. 3 and 4, the projection 33 has a curved configuration depicting a concave inner surface 34 and a convex outer surface 35. In the embodiment of the spacer member depicted in FIG. 5, the projection 33 extends substantially vertically from the base portion 31. The base portion 31 has at least one hole 35 formed therethrough to facilitate mounted connection of the spacer member 30 to the support bar 20 for use, as is depicted in FIG. 6. In this regard, a screw or similar fastener, may be employed to securely position the spacer member 30 on the support bar 20, which can be readily removed or replaced as desired.

As is depicted in FIG. 6, in use the spacer member 30 is attached to the support bar 20 such that the projection 33 abuts the winding of the coil member 15. The spacer member 30 thereby functions to hold and position the coil member 15 with respect to the hub portion to avoid any contact between the coil member 15 and the peripheral flange portion 13 of the hub portion 12. Furthermore, by employing the spacer members to engage with the coil member windings, the coil member 15 is prevented from moving across or over the peripheral flange portion 13 of the hub portion 12 where it may lose its flexibility and as a result, its ability to shed any build-up of foreign material on the surface of the gauge wheel. By positioning the windings of the coil member 15 on the support bars 20, more flex is generated within the coil member 15 to provide a self-cleaning function, whilst minimising bounce of the gauge wheel due to inadvertent movement of the coil windings over the surface of the wheel. The coil member is also less likely to break due to the constrained nature of the windings and the spacing's between the windings of the coil are able to maintained at wide distances to facilitate release of any build-up of foreign matter lodged therebetween.

The peripheral flange portion 13 of the hub portion 12 may also have a bevelled outer edge (not shown). The bevelled outer edge may have an angle of between 5-50, preferably around 15 degrees from the horizontal to assist in cleaning a disc when the gauge wheel is mounted to cultivation equipment. Such a bevelled edge will also minimise compaction of the soil against a seed furrow during use.

Figure 7:
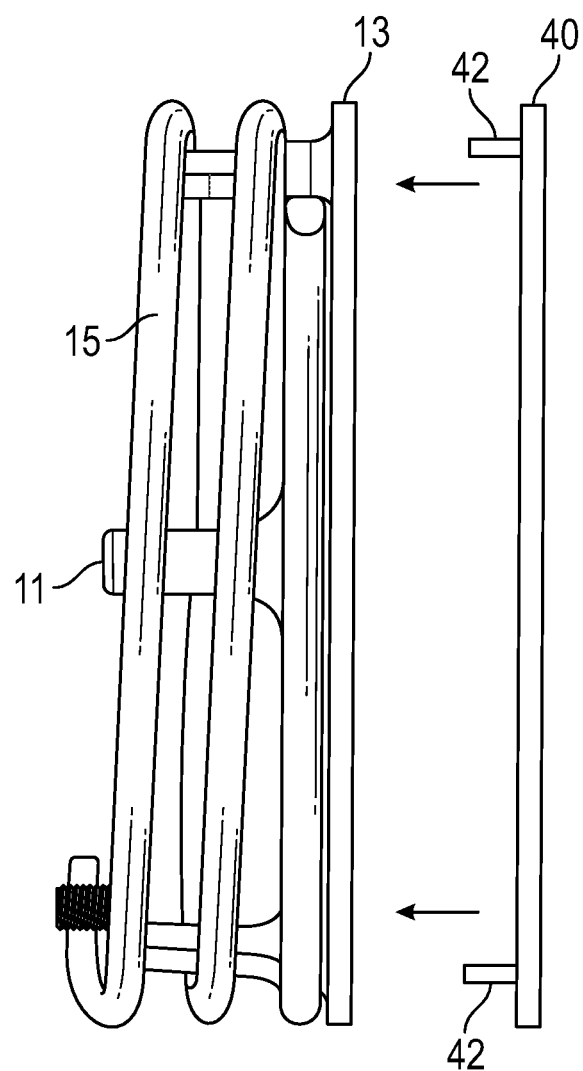
FIG. 7 is a top view of an alternative embodiment of the gauge wheel of the present invention with a removable lip member depicted.

Referring to FIG. 7, there is depicted another embodiment of the gauge wheel system of the present invention that can be used with or without the above referenced spacer members. The gauge wheel 10 comprises a hub portion 12 and coil member 15 configured in the manner as described above. A lip member 40 is provided which is configured to be mounted to an outer edge of the peripheral flange portion 13. Whist not shown in FIG. 7, the lip member 40 is substantially circular and has a diameter that matches the diameter of the peripheral flange portion 13 of the hub portion 12 such that when it is fitted to the peripheral flange portion 13, it substantially covers the outer surface thereof.

The lip member 40 has mounting arms 42 that extend substantially orthogonally with respect to the body of the lip member 40, as shown. The mounting arms 42 are configured to be mounted to a spoke 14 of the hub portion 12 by way of screws or similar fastening members. In this arrangement the lip member 40 may be mounted or demounted as desired so as to provide wear protection to the outer surface of the peripheral flange portion 13, which often contacts the disc and wears overtime.

Yet another embodiment of a gauge wheel 50 of the present invention is depicted in FIGS. 8-11. In this embodiment, the gauge wheel 50 has a hub portion 52 that is formed separately to the peripheral flange 60, such that the peripheral flange 60 can be replaced as required, in a manner as will be discussed in more detail below.

The hub portion 52 is in the form of a substantially planar body having a central recess 51 for receiving a central bearing 53. Three spoke members 54 extend radially from the central recess 51 and terminate at a free end 54a. A mount portion 56 extends between two of the spoke members 54, to form a plate for mounting an end of the resilient coil 55 thereto.

Figure 8:
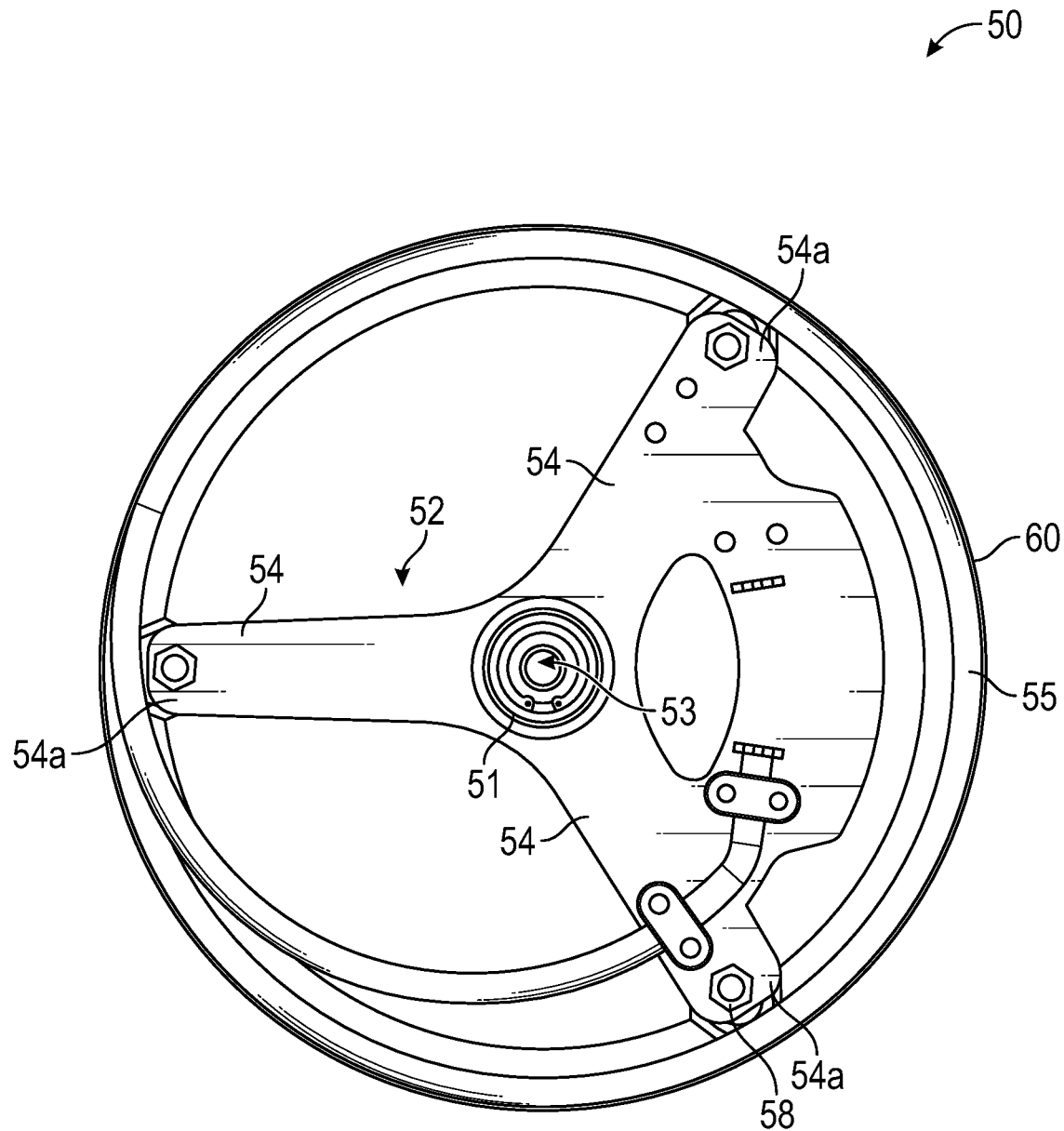
FIG. 8 is a plan view of a gauge wheel in accordance with an alternative embodiment of the present invention.

As is shown in FIG. 8, one end of the resilient coil 55 is mounted to the mount portion 56 of the hub portion 52 by way of brackets 57. The second end of the coil is wound in at least two full loops to extend laterally behind the hub portion 52. The diameter of the winding of the coil 55 is substantially equivalent to the diameter of the peripheral flange 60, as is shown more clearly in FIG. 9.

Figure 9:
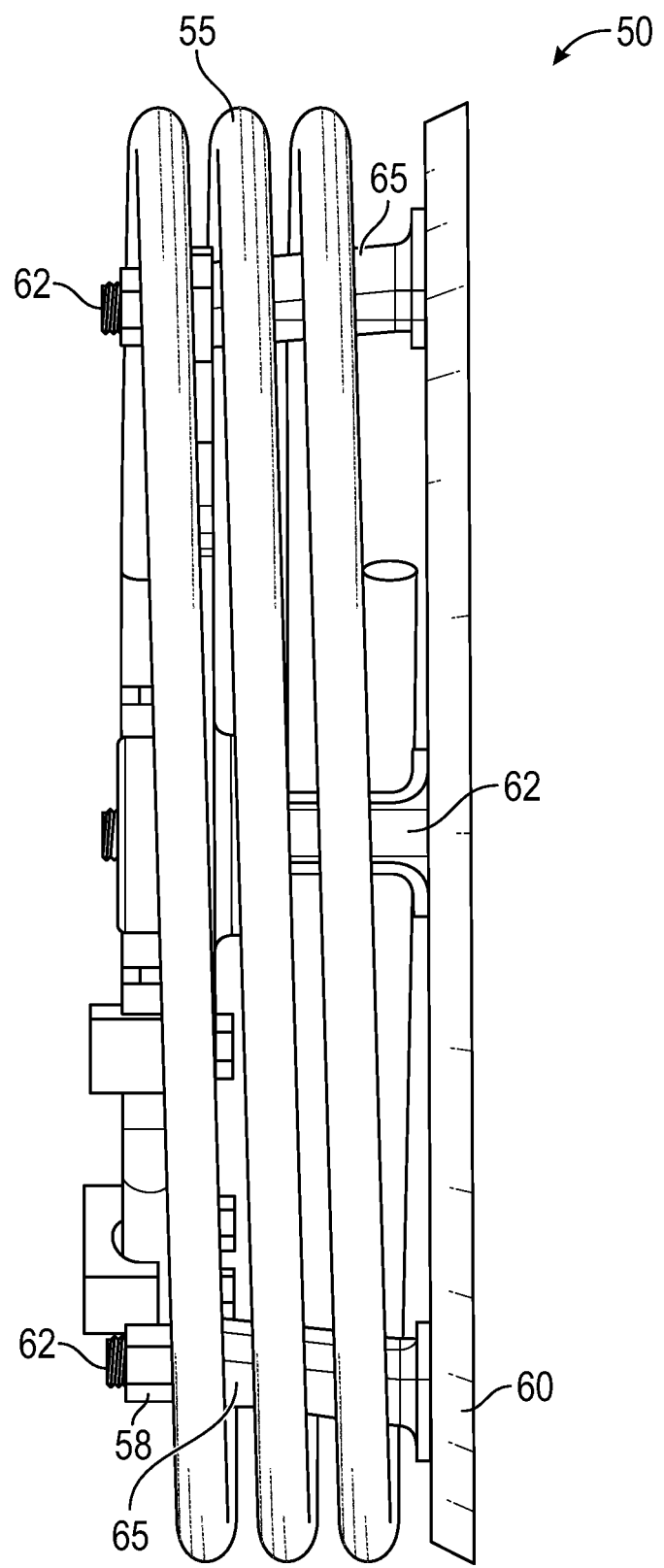
FIG. 9 is side view of the gauge wheel of FIG. 8.
Figure 10:
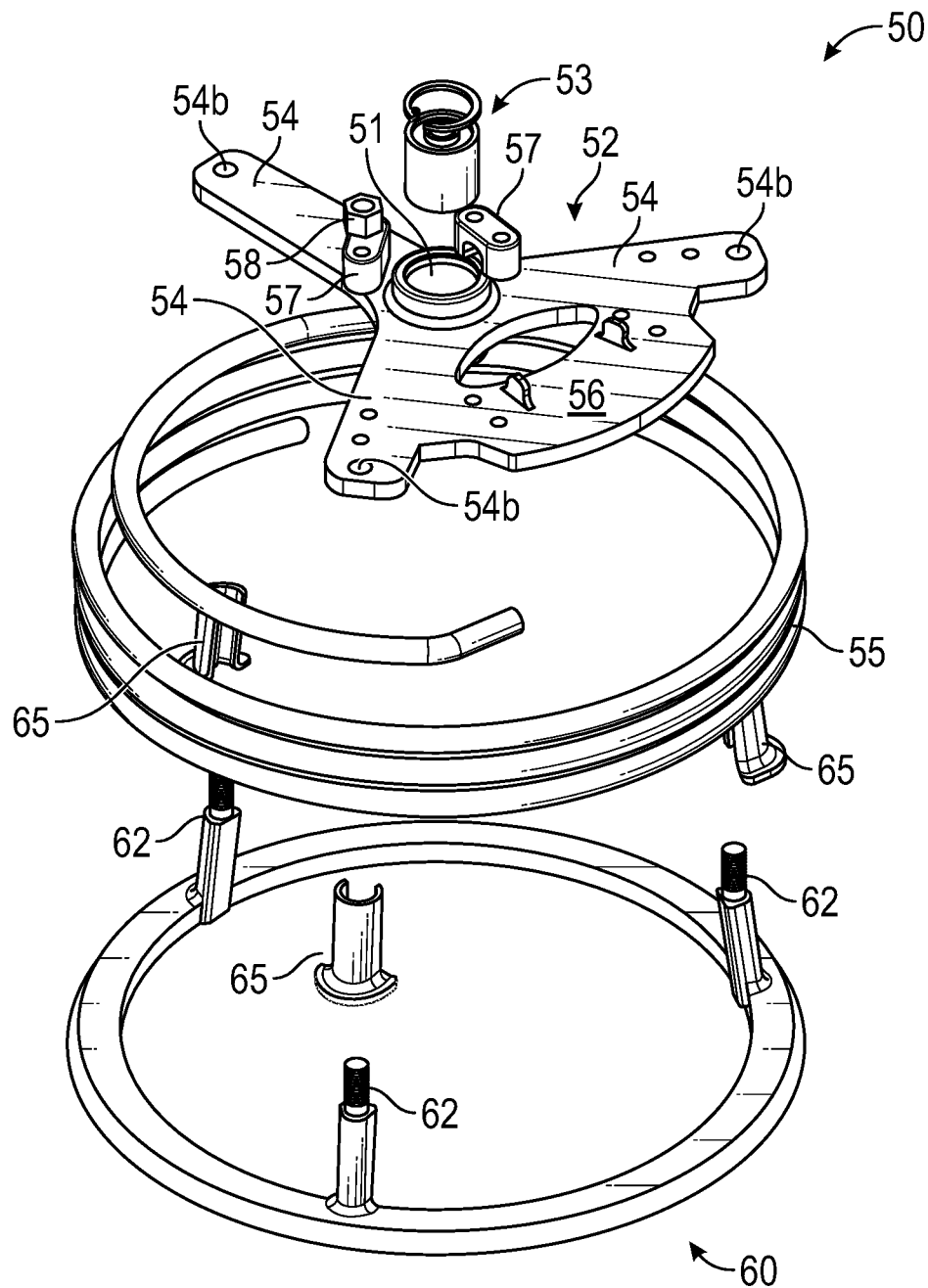
FIG. 10 is an exploded view of the gauge wheel of FIG. 8.

The peripheral flange 60 is mounted to the hub portion 52 by way of support bars 62. The support bars 62 project from a surface of the peripheral flange 60 as best shown in FIG. 10. The end of the support bars 62 have a thread formed thereon that is configured to pass through holes 54b provided in the free ends 54a of the spoke members 54. Securing nuts 58 are provided to secure the end of the support bars 62 to the spoke members 54 as shown in FIG. 9.

Figure 11:
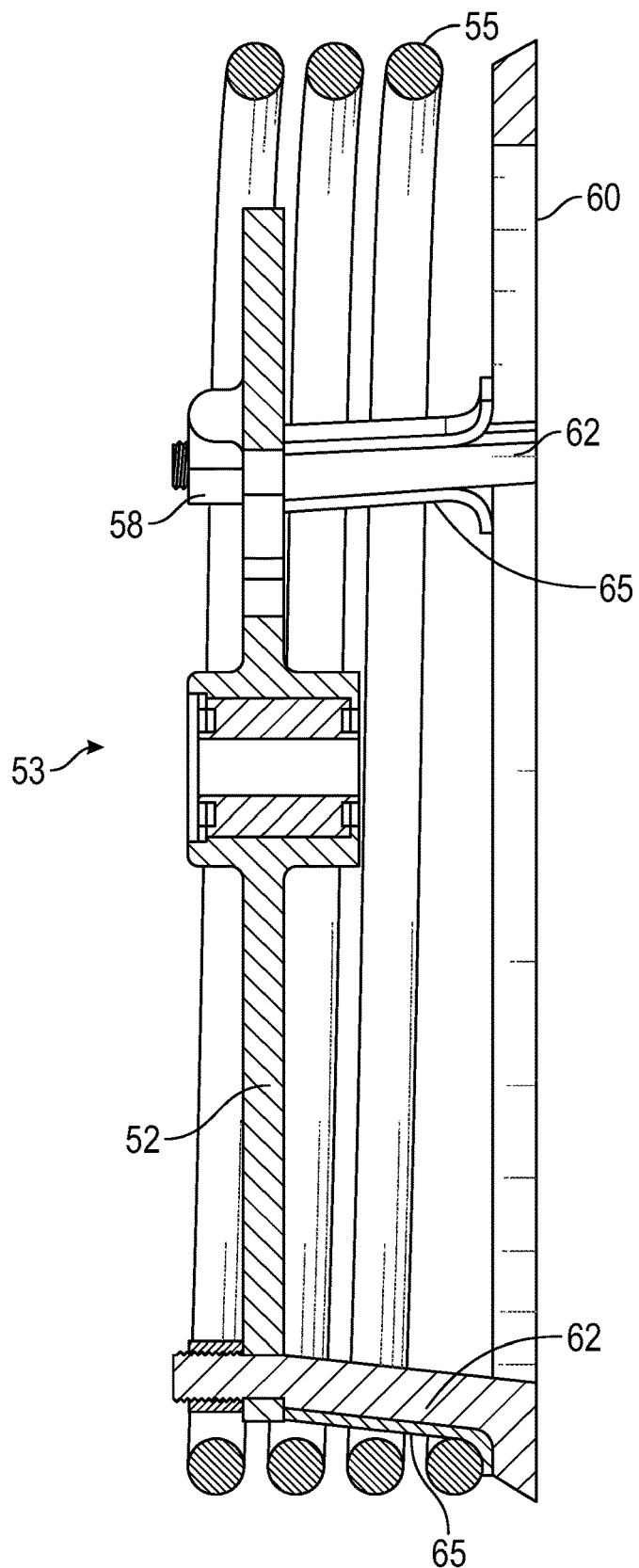
FIG. 11 is a sectional side view of the gauge wheel of FIG. 8.

The coil 55 is wound about the support bars 62 as is shown in FIG. 11. Cover members 65 are provided to fit over the support bars 62 to minimise wear between the coil 55 and the support bars 62 when in use. The cover members 65 are made from a wear resistant material, such as nylon or a similar plastic, to accommodate movement between the coil 55 and the support bars 62 without causing wear between the parts. The cover members 65 are also shaped to prevent the rearmost coil 55 from contacting the surface of the peripheral flange 60 and to ensure that the rearmost coil 55 is spaced from the surface of the peripheral flange 60 during use, as is show in FIG. 11.

In the gauge wheel 50, should the peripheral flange 60 require replacement, it can be simply detached from the hub portion 52 and replaced as required. The cover members 65 can also be replaced by simply detaching the peripheral flange 60 from the hub portion 52. The outer edge of the peripheral flange is depicted as having a bevel or angled surface, as previously discussed in relation to the earlier embodiments.

It will be appreciated that the gauge wheel of the present invention employs a hub portion that is significantly exposed due to only three spoke members employed thereon. This not only minimises the weight of the gauge wheel, but also ensures that any organic material or mud that enters the hub portion 12 will be less likely to become lodged and collect therein and build-up over time. Similarly, the space between the coil windings is maximised to further minimise organic material or mud building up therebetween. Also, by providing a means for locating ad retaining the coil with respect to the peripheral flange, the coil retains its flexibility and is prevented from any undue wear that may occur should the coil move into contact with the other metal components of the gauge wheel. This ensures that the working life of the gauge wheel is maximised and provides a degree of variability in relation to the structural set up of the gauge wheel depending upon the type of soil and the operating conditions.

The gauge wheel of the present invention may be used in association with a cutting disc assembly having one or more rotating cutting discs for cutting a furrow or furrows in a field. In this regard, the gauge wheel may be fitted to the outside of cutting disc assembly, sharing the same axle, to control the depth of cutting. Alternatively, the gauge wheel may be mounted on a separate axle to the cutting device.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the gauge wheel uppermost.

It will be appreciated by those skilled in the art that many modifications and variations may be made to the methods of the invention described herein without departing from the spirit and scope of the invention.

The claims defining the invention are as follows:

1. A gauge wheel for use on cultivation equipment comprising:
   a hub member having a central bearing portion for mounting to the cultivation equipment;
   a peripheral flange portion displaced laterally with respect to the hub member; and
   a resilient coil member mounted to a surface of the hub member at a proximal end and comprising at least two windings that extend between the hub member and the peripheral flange portion to terminate at a free distal end adjacent the peripheral flange portion, wherein the free distal end of the resilient coil member is constrained to prevent contact of the resilient coil member with the peripheral flange portion, wherein the hub member comprises at least three spokes that extend radially from the central bearing portion to define a surface of the hub member that is substantially open, wherein the peripheral flange portion is detachably mounted to the hub member at a distal end of the spokes, and wherein the peripheral flange portion is detachably mounted to the distal end of the spokes by way of a plurality of support bars.

2. A gauge wheel according to claim 1, wherein the support bars are mounted to a surface of the peripheral flange portion and extend inside the resilient coil member to engage with the distal ends of the spokes.

3. A gauge wheel according to claim 2, wherein the at least one of the support bars has a cover member mounted thereon, the cover member being configured to contact the resilient coil member to constrain and prevent contact of the resilient coil member with the peripheral flange portion.

4. A gauge wheel according to claim 1, wherein the peripheral flange portion is formed integral with the hub member.

5. A gauge wheel according to claim 4, wherein the hub member has at least three spoke members extending between the central bearing portion and the peripheral flange portion such that the hub member is substantially open.

6. A gauge wheel according to claim 1, wherein at least one space member is mounted to the hub member so as to locate and constrain the resilient coil member in position.

7. A gauge wheel according to claim 6, wherein the at least one space member is mounted on a support bar extending from the peripheral flange portion and within the windings of the resilient coil member towards the hub member.

8. A gauge wheel according to claim 7, wherein at least two support bars extend from the peripheral flange portion at opposing positions about a periphery thereof.

9. A gauge wheel according to claim 7, wherein the at least one space member has a projection that abuts the coil member to substantially constrain the coil member in position.

10. A gauge wheel according to claim 7, wherein the projection is configured to at least partially receive the coil member.

* * * * *